(12) United States Patent
McSherry et al.

(10) Patent No.: US 12,329,154 B2
(45) Date of Patent: Jun. 17, 2025

(54) NON-SORPTIVE OR MINIMALLY SORPTIVE DISINFECTANT WIPES

(71) Applicant: ECOLAB USA INC., St. Paul, MN (US)

(72) Inventors: David D. McSherry, St. Paul, MN (US); Junzhong Li, Eagan, MN (US); Richard K. Staub, Bloomington, MN (US); Joy G. Herdt, Hastings, MN (US); Sherri L. Tischler, Inver Grove Heights, MN (US)

(73) Assignee: ECOLAB USA INC., St. Paul, MN (US)

( * ) Notice: Subject to any disclaimer, the term of this patent is extended or adjusted under 35 U.S.C. 154(b) by 538 days.

(21) Appl. No.: 16/694,739

(22) Filed: Nov. 25, 2019

(65) Prior Publication Data

US 2020/0163329 A1 May 28, 2020

Related U.S. Application Data

(63) Continuation of application No. 14/199,202, filed on Mar. 6, 2014, now abandoned.

(60) Provisional application No. 61/790,458, filed on Mar. 15, 2013.

(51) Int. Cl.
| | | |
|---|---|---|
| *A01N 41/04* | (2006.01) | |
| *A01N 25/10* | (2006.01) | |
| *A01N 25/34* | (2006.01) | |
| *A61L 2/00* | (2006.01) | |

(52) U.S. Cl.
CPC ............. *A01N 25/10* (2013.01); *A01N 25/34* (2013.01); *A01N 41/04* (2013.01)

(58) Field of Classification Search
CPC ...... C11D 17/049; C11D 3/48; A61K 8/0208; A61K 2800/56; A61K 2800/594; A61K 2300/00; A61K 2800/596; A61K 2800/30; A61K 2800/5424; A61K 9/7007; A61K 2800/54; A61K 9/08; A61Q 17/005; A61Q 19/00; A01N 41/04; A01N 25/30; A01N 25/34; A01N 25/02; A01N 59/02; A01N 59/00; B08B 1/006; A61L 2/00
See application file for complete search history.

(56) References Cited

U.S. PATENT DOCUMENTS

| | | | |
|---|---|---|---|
| 3,895,474 A | 7/1975 | Bauer | |
| 4,408,996 A | 10/1983 | Baldwin | |
| 4,666,621 A | 5/1987 | Clark et al. | |
| 4,737,405 A | 4/1988 | Bouchette | |
| 4,759,867 A | 7/1988 | Choy et al. | |
| 4,781,974 A | 11/1988 | Bouchette et al. | |
| 4,847,088 A | 7/1989 | Blank | |
| 4,941,989 A | 7/1990 | Kramer et al. | |
| 4,946,617 A | 8/1990 | Sheridan et al. | |
| 5,141,803 A | 8/1992 | Pregozen | |
| 5,152,996 A | 10/1992 | Corey et al. | |
| 5,419,908 A | 5/1995 | Richter et al. | |
| 5,421,898 A | 6/1995 | Cavanagh | |
| 5,958,491 A * | 9/1999 | Knueven ................. | A23L 21/10 426/321 |
| 6,258,368 B1 | 7/2001 | Beerse et al. | |
| 6,258,455 B1 | 7/2001 | Clarke | |
| 6,410,499 B1 | 6/2002 | Julemont et al. | |
| 6,482,423 B1 | 11/2002 | Beerse et al. | |
| 6,488,948 B1 | 12/2002 | Danicli | |
| 6,610,314 B2 | 8/2003 | Koenig et al. | |
| 6,667,290 B2 | 12/2003 | Svendsen | |
| 6,699,825 B2 † | 3/2004 | Rees | |
| 6,838,078 B2 | 1/2005 | Wang et al. | |
| 6,916,776 B2 | 7/2005 | Svendsen | |
| 6,936,580 B2 | 8/2005 | Sherry et al. | |
| 6,994,890 B2 | 2/2006 | Ohlhausen et al. | |
| 7,160,846 B2 | 1/2007 | Biering et al. | |

(Continued)

FOREIGN PATENT DOCUMENTS

| | | |
|---|---|---|
| EP | 0 131 394 A2 | 1/1985 |
| EP | 1 488 815 A1 | 12/2004 |

(Continued)

OTHER PUBLICATIONS

Bourgeois, Michel, Index 93 Congress Session 3D: R & D—Polymer Fibres & Surface Modification, "Fibres with Antiseptic Action," Innventia AB (1993).

Getman, Gerry, An Advanced Polymeric Antimicrobial for Non Woven Fabrics and Solid Materials including Spun Plastic Resins, Sep. 2007, Presentation from INDA/TAPPI International Nonwovens Technical Conference.

Masuku, S. M., et al. "Cleaning and decontamination efficacy of wiping cloths and sliver dihydrogen citrate on food contact surfaces," Journal of Applied Microbiology, vol. 113, pp. 89-95, ISSN 1364-5072, 2012.

(Continued)

*Primary Examiner* — Tracy Liu
(74) *Attorney, Agent, or Firm* — Merchant & Gould P.C.

(57) ABSTRACT

A disinfectant wipe is provided including a substrate that is substantially free of polyamides, and an acid anionic disinfectant is adsorbed to the substrate such that the disinfectant readily releases from the substrate to allow at least 65% delivery of the disinfectant when wiped on a surface. The substrate may be a woven, nonwoven, knit fabric, a foam, sponge or film composition and may be formed from polyester, polypropylene, nylon, cotton, rayon, acrylic, or combinations thereof. The acid anionic disinfectant has a pH below 7, below 5, below 3 and below 2. The substrate used to prepare the disinfectant wipe is not pretreated with the disinfectant or a release composition before applying the disinfectant. That is, the disinfectant is not applied and re-applied to ensure release onto a surface. In an embodiment of the invention acid anionic disinfectant is an antimicrobial agent.

26 Claims, 4 Drawing Sheets

(56) References Cited

U.S. PATENT DOCUMENTS

| | | |
|---|---|---|
| RE40,495 E | 9/2008 | Svendsen |
| 7,432,234 B2 | 10/2008 | Ochomogo et al. |
| 7,485,589 B2 | 2/2009 | Ellis |
| 7,696,109 B2 * | 4/2010 | Ouellette ............... A47L 13/17 428/220 |
| 7,700,530 B2 | 4/2010 | Mundschau et al. |
| 7,799,751 B2 | 9/2010 | Kilkenny et al. |
| 7,858,106 B2 | 12/2010 | Nonaka |
| 7,998,495 B2 | 8/2011 | Argo et al. |
| 8,287,657 B2 | 10/2012 | Song et al. |
| 8,388,922 B2 | 3/2013 | Sotowa et al. |
| 8,486,427 B2 | 7/2013 | Colman et al. |
| 8,545,862 B2 | 10/2013 | Toreki et al. |
| 8,809,213 B2 | 8/2014 | Wildeman et al. |
| 10,238,108 B2 † | 3/2019 | Griese |
| 10,294,444 B2 | 5/2019 | Turk et al. |
| 2002/0049257 A1 | 4/2002 | Natsch |
| 2002/0155969 A1 | 10/2002 | Rees et al. |
| 2003/0194932 A1 | 10/2003 | Clark et al. |
| 2004/0137815 A1 | 7/2004 | Ellis et al. |
| 2004/0157931 A1 | 8/2004 | Ra et al. |
| 2004/0228904 A1 | 11/2004 | Ellis et al. |
| 2005/0047961 A1 † | 3/2005 | Bains et al. |
| 2005/0239356 A1 | 10/2005 | Parsons et al. |
| 2006/0062832 A1 | 3/2006 | Lopes |
| 2006/0128248 A1 | 6/2006 | Ellis |
| 2007/0141127 A1 | 6/2007 | Casas-Sanchez et al. |
| 2007/0142261 A1 | 6/2007 | Clark et al. |
| 2007/0237807 A1 | 10/2007 | Luu et al. |
| 2009/0285871 A1 † | 11/2009 | Cunningham et al. |
| 2010/0101605 A1 | 4/2010 | Saint Victor |
| 2010/0113537 A1 | 5/2010 | Nonaka |
| 2010/0136074 A1 | 6/2010 | Bukshpan et al. |
| 2010/0207805 A1 | 8/2010 | Haworth |
| 2011/0097422 A1 * | 4/2011 | Lopes .................... A01N 41/04 424/637 |
| 2011/0177148 A1 | 7/2011 | Dicosimo et al. |
| 2012/0045496 A1 | 2/2012 | Short et al. |
| 2012/0070480 A1 | 3/2012 | Amos et al. |
| 2012/0070481 A1 | 3/2012 | Bolkan et al. |
| 2012/0171155 A1 | 7/2012 | Cunningham et al. |
| 2012/0171300 A1 | 7/2012 | Koenig et al. |
| 2012/0207805 A1 | 7/2012 | Colman et al. |
| 2013/0058880 A1 | 3/2013 | Dong |

FOREIGN PATENT DOCUMENTS

| | | |
|---|---|---|
| EP | 1 747 258 B1 | 7/2008 |
| WO | 01/00782 A1 | 1/2001 |
| WO | 2004/041312 A2 | 5/2004 |

OTHER PUBLICATIONS

Dychdala et al. (1991), Surface-Active Agents: Acid-Anionic Compounds, in Seymour S. Block, Disinfection, Sterilization, and Preservation (4th ed., pp. 256-261), Lea & Febiger ("Dychdala").†

\* cited by examiner
† cited by third party

Figure 1
LAS Titration Standards' Curve

Figure 2
Expressed LAS
with Polyamide vs Polyamide Free Microfiber

Figure 3
Expressed LAS from a mixed polyamide-polyester microfiber
at pH 5.0

Figure 4
Expressed LAS from a pure polyester
microfiber at pH 2.5

NON-SORPTIVE OR MINIMALLY SORPTIVE DISINFECTANT WIPES

CROSS-REFERENCE TO RELATED CASES

This application is a continuation of U.S. application Ser. No. 14/199,202, filed Mar. 6, 2014, which claims priority under 35 U.S.C. § 119(e) to U.S. Provisional Application entitled "Non-Sorptive or Minimally Sorptive Disinfectant Wipes," Ser. No. 61/790,458, filed on Mar. 15, 2013, which is incorporated herein by reference in its entirety for all purposes.

FIELD

The invention generally relates to an article for cleaning and/or sanitizing a surface. More particularly, the invention relates to substrates particularly suitable for delivering a disinfectant or antimicrobial agent. The invention also relates to substrates coated with such a disinfectant or antimicrobial agent.

BACKGROUND

Disposable substrates are commonly used in cleaning applications. Suitable substrates include woven and nonwoven fabrics and various combinations thereof. Such substrates have been impregnated with cleaning agents such as disinfectants, solvents, anti-microbials, detergents and the like. The resulting cleaning products fabricated from such impregnated substrates are accepted as a convenient and practical means for cleaning surfaces.

Nonwoven surface cleaning or sanitizing articles fabricated for the food service or hospitality industry often include a fibrous blend of polyester and rayon, as well as a binder formulation. Such sanitizing articles are more popular as compared to terry cloth towels due to the benefits derived from using a limited or single use sanitizing or cleaning article. Reusable damp woven terry cloth towels are thought to be more susceptible to bacterial build up as they are left standing wet between uses. It is also thought that repeatedly using a standing damp towel to wipe down a food prep surface may actually result in reintroducing harmful bacteria into the food preparation area.

As the use of disposable sanitizing wipes has increased, nonwoven fabrics have been engineered to facilitate the sanitizing process of food preparation and serving surfaces. Despite these developments, it has been found that certain nonwoven fabrics have a detrimental effect on a sanitizing solution. It has been found that the inherent or applied ionic properties of the sanitizing and/or cleaning article may neutralize the effectiveness of the sanitizing solution over time. Many wipe or towel substrates possess good absorption of antimicrobial solutions but many bind via chemical affinity interactions with acid-anionic antimicrobials as well as quaternary ammonium antimicrobials. This second property known as adsorption does not allow recovery or expression of the antimicrobial agents of use-solutions. Such adsorption results in failure to produce the claimed antimicrobial efficacy. When attempting to deliver an antimicrobial agent this is an unwelcome property and is not easily overcome.

The art is replete with pre-treatments useful for overcoming the binding affinity by the substrate for the disinfectant. In addition they generally focus upon aiding the release or expression of quaternary actives which possess a positive charge rather than the anionic species characterizing acid-anionic antimicrobials which possess the opposite charge. However, such pre-treatments add another step, additional chemicals, and added expense to a single use disinfectant wipe. To date the industry has attempted to eliminate or mitigate interaction between the disinfectant and the substrate by pretreating the substrate with the disinfectant. Such a pretreatment in essence saturates the substrate. However, as one can imagine, a larger amount of disinfectant is required in order to ensure that a suitable amount is expressed from the substrate upon contact with the surface intended for disinfecting. Another method of reducing the interaction between the disinfectant and the substrate involves coating the substrate with a chemical to neutralize the substrate such that the substrate no longer binds or interacts with the disinfectant. This, as with the disinfectant pretreating just discussed, requires an additional step in the manufacturing process resulting in additional time and cost.

A need exists for a disposable wipe that is inexpensive and does not require additional coatings or pre-treatments in order to allow the disinfectant to release from the substrate. There is also a need for a disposable external surface cleaning and/or sanitizing wipe that may be used in conjunction with an acidic anionic disinfectant which does not interact with or impede the delivery of the disinfectant to the intended surface. The present invention provides an elegant solution to reduce or eliminate the interaction of substrate with an acidic anionic disinfectant

SUMMARY

The invention provides a disinfectant wipe comprised of a substrate substantially free of polyamides, and an acid anionic disinfectant adsorbed to the substrate such that the disinfectant readily releases from the substrate to allow at least 65% delivery of the disinfectant when wiped on a surface. In addition to being polyamide free the substrate must be substantially free of functional groups which possess Lewis base properties or cationic functional groups. Such functional groups are common in the pulp and paper industry for their substantive properties and they may also be employed to increase the release of quaternary antimicrobials. While useful for minimizing the absorption of quaternary antimicrobials they will strongly bind acid anionic actives. The substrate may be a woven, nonwoven, knit fabric, a foam, sponge or film composition. The wipe substrate may be made of polyester, polypropylene, nylon, cotton, rayon, acrylic, or combinations thereof. Disinfectant disposable wipes of the invention provide at least about a 65% delivery rate when wiped on a surface.

The disinfectant wipe of the invention may be crafted of synthetic material which may be polyolefin. In an embodiment of the invention the wipe substrate is polyethylene or polypropylene or combinations thereof. The substrate of the disinfectant wipe may be manufactured by spinbonding, meltblowing, dry laid, air laid or wet laid processes.

The substrate of the disinfectant wipe is not pretreated with the disinfectant or a release composition before applying the disinfectant. The disinfectant used on the substrate may be an antimicrobial agent.

DETAILED DESCRIPTION

As used herein, the term Lewis base refers to those functional groups such as amide nitrogens which possess "free" lone pairs of electrons whose conjugate acid have pKa's of about 0 or higher.

"Cleaning" means to perform or aid in soil removal, bleaching, microbial population reduction, rinsing, or combination thereof.

As used herein, weight percent (wt %), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The term "substantially free" may refer to any component that the composition of the invention lacks or mostly lacks. When referring to "substantially free" it is intended that the component is not intentionally added to compositions of the invention. Use of the term "substantially free" of a component allows for trace amounts of that component to be included in compositions of the invention because they are present in another component. However, it is recognized that only trace or de minimus amounts of a component will be allowed when the composition is said to be "substantially free" of that component. Moreover, the term if a composition is said to be "substantially free" of a component, if the component is present in trace or de minimus amounts it is understood that it will not affect the effectiveness of the composition. It is understood that if an ingredient is not expressly included herein or its possible inclusion is not stated herein, the invention composition may be substantially free of that ingredient. Likewise, the express inclusion of an ingredient allows for its express exclusion thereby allowing a composition to be substantially free of that expressly stated ingredient.

As used herein the term, "consisting essentially of" in reference to a composition refers to the listed ingredients and does not include additional ingredients that, if present, would affect the cleaning ability of the cleaning composition. The term "consisting essentially of" may also refer to a component of the cleaning composition. For instance, a surfactant package may consist essentially of two or more surfactants and such surfactant package would not include any other ingredients that would affect the effectiveness of that surfactant package—either positively or negatively. As used herein the term "consisting essentially of" in reference to a method of cleaning refers to the listed steps and does not include additional steps (or ingredients if a composition is included in the method) that, if present, would affect the cleaning ability of the cleaning method.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2). The EPA Methods and Guidelines are hereby incorporated by reference in their entirety for all purposes. According to this reference a sanitizer should provide a 99.999% reduction (5-log order reduction) within 30 seconds at room temperature, 25±2° C., against several test organisms.

As used herein, the term "disinfectant" refers to an agent that kills all vegetative cells including most recognized pathogenic microorganisms, using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2). Such EPA Procedures and Guidelines are hereby incorporated by reference in their entirety for all purposes. As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills Mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic. A sanitizer and a disinfectant are, by definition, agents which provide antimicrobial or microbiocidal activity. In contrast, a preservative is generally described as an inhibitor or microbiostatic composition.

The present invention contemplates the possibility of omitting any components listed herein. The present invention further contemplates the omission of any components even though they are not expressly named as included or excluded from the invention.

These and other aspects, advantages, and salient features of the present invention will become apparent from the following description and the appended claims.

The present invention begins with a suitable substrate. A suitable substrate of the invention does not adsorb to the disinfectant or anti-microbial agent. In accordance with the present invention, the substrate may include natural fiber, synthetic fiber and combinations thereof. Suitable natural fibers include, but are not limited to rayon, wood pulp, silk, jute, hemp, linen, sisal and combinations thereof. Synthetic fibers that may be used in accordance with the present invention include those formed from polymers chosen from the group of thermoplastic polymers consisting of polyolefin, and polyesters wherein the polyolefins are chosen from the group consisting of polypropylene, polyethylene, and combinations thereof. Substrates of the present invention are chosen such that they do not contain polyamides. It has surprisingly been found that polyamides cause unwanted adsorption or binding of the antimicrobial agent to the substrate causing the acid-anionic antimicrobial agent to adhere. Such adherence or adsorption does not allow the disinfectant or antimicrobial agent to release satisfactorily. Such failure to release results in failure to clean or disinfect or sanitize a surface upon which the substrate is wiped.

Without being bound by theory, it is believed that the amide nitrogens in the substrate bind strongly to acid anionic disinfectants. That is, when disinfectants contain acid anionics, the wipe substrate adheres to the disinfectant disallowing release of the disinfectant onto the surface that needs disinfecting. It is believed that the bind is a result of a weak to moderate base provided by the amide nitrogens that is intrinsic to polyamides. It is hypothesized that the lone pair of electrons found on the amide nitrogens are protonated at the low pH. The low pH is required for efficacy of the acid anionic disinfectant but in turn the protonated nitrogens develop a positive ionic charge that is believed to strongly bind with the anionic species. Such binding occurs at low pH. However, at near neutral pH the anionic species are completely recovered after expressing the wipes. In addition, cationic-strength additives and other compounds are often added to improve strength to microfiber wipes properties. However, these create a direct ionic attraction to the antimicrobial active anionic agents.

Microfiber products used for consumer cleaning are generally constructed from split conjugated fibers of polyester and polyamide. While this combination of fibers provide extreme durability, the polyamide portion has been found to be excessively absorptive of acid anionics. A recent development in microfiber technology is a polyamide free version which has been shown to maintain the positive properties for a wiping disinfectant product but unlike the mixed textile, the absorption of the polyamide free version is essentially reversible allowing its liberation at cleaning time.

The acid anionic disinfectant of the present invention used to first coat the substrate and then used to release from the substrate has a pH below 7. In an embodiment of the invention, the acid anionic has a pH below about 6, about 5, about 4, about 3, and about 2. According to the above-mentioned theory, one skilled in the art will appreciate that the adsorption of the disinfectant to the substrate becomes more problematic the more acidic, or the lower the pH of the anionic disinfectant. To this end, the lower the pH of the anionic, the more important it becomes to provide a substrate that is substantially free of or free of polyamides and cationic residues. In an embodiment an acid anionic disinfectant includes but is not limited to linear alkylbenzene sulfonic acid/dodecylbenzxene sulfonic acid ("LAS/DDBSA"). Other examples of acid anionic disinfectants useful in preparing disinfectant wipes of the invention include sodium dodecylsulfate ("SDS"), sodium lauryl sulfate ("SLS"), sulfonated oleic acid, and the potassium or sodium salts thereof. One skilled in the art will readily recognize other acid anionic disinfectants useful in preparing disinfectant wipes of the present invention.

The disinfectant coated onto the substrate may optionally further include one or more additives such as fragrances, dyes, pigments, emollients, bleaching agents, anti-static agents, anti-wrinkling agents, odor removal/odor capturing agents, ultraviolet light protection agents, insect repellency agents, souring agents, mildew removing agents, allergicide agents, and mixtures thereof. However, none of these optional additives are intended to serve as a pretreatment or bond-diminishing coating on the substrate. It is envisioned that such optional/additional ingredients would be added with the disinfectant to the substrate surface. If such optional/additional ingredients act to allow the disinfectant to release from the substrate, such optional/additional ingredients would not be used to pretreat the substrate. That is, the optional or additional ingredients would not be added to the substrate before the disinfectant.

Disinfectants are coated onto the substrate for length of times from about 20 seconds, 30 seconds, 45 seconds, 1 minute, 2 minutes, 5 minutes, 10 minutes and up to about days, months, and even years. Pre-coated wipes may be sold in airtight containers. Such pre-coated wipes may be in contact with the disinfectant for months and up to years. The present invention allows release of the anionic acid disinfectant from the wipes no matter the length of the coating or soaking time.

EXAMPLES

The following "Wipe Protocol" was used in each of the Examples and Comparative Examples. The Wipe Protocol involves the providing three (triplicate) virgin wipes measuring 12"×12" and placing the wipes in a 6"×6" square tub into which about 65 g of an antimicrobial solution is poured. After a defined exposure time, the trio of wipes are squeezed vigorously together to express a weighed quantity of liquid of about 8 g. The expressed solutions were titrated for the active component. The titrated active component was compared to the active level of the initial antimicrobial solution to determine the portion of active solution not recovered from the wipes. This was plotted with respect to exposure time. The "% lost" active was calculated by dividing the difference between the initial and the expressed active level by the initial active level and multiplying by 100%.

Example 1

Example 1 compares a mixed polyester-polyamide microfiber against a microfiber that has had the polyamide portion extracted. The Epton 2-phase titration method as provided in ASTM Method D 1691-83 which is herein incorporated by reference in its entirety for all purposes was used to quantitate the LAS for the acid anionic, generally LAS/DDBSA (linear alkylbenzene sulfonic acid/dodecylbenzxene sulfonic acid). Table 1 provides results:

TABLE 1

Standard set using LAS Disinfectant at 32:1 dilution in water.

| sample (g) | LAS (mg) | Hyamine 1622 ®* at 3K (mL) |
|---|---|---|
| 5.08 | 16.9 | 8.1 |
| 5.35 | 17.8 | 8.6 |
| 5.03 | 16.7 | 8 |
| 5.16 | 17.1 | 8.3 |
| 5.33 | 17.7 | 9 |
| 5.48 | 18.2 | 9.6 |
| 2.13 | 7.1 | 3.75 |
| 3.06 | 10.2 | 5.2 |
| 3.46 | 11.5 | 5.9 |
| 4.71 | 15.6 | 7.9 |
| 2.16 | 7.2 | 3.7 |
| 3 | 10.0 | 5.2 |
| 3.57 | 11.9 | 6.2 |
| 4.03 | 13.4 | 7 |

*Benzethonium chloride available from Sigma Aldrich located in St. Louis, MO

Example 1 demonstrates the advantage of utilizing polyamide-free microfibers to allow nearly complete expression of the LAS active from the absorbed solution while the polyamide-containing microfiber releases only about 30% of the absorbed LAS. Results are provided in Tables 2 and 3 below:

TABLE 2

Poly Amide-Polyester fiber

| Time (min) | Sample 1 (wt, g) | Sample 2 (wt, g) | Vol titrant (mL) 1 | Vol titrant (mL) 2 | [LAS] (ppm) 1 | [LAS] (ppm) 2 | [LAS] average (ppm) | Initial liquid Conc. (ppm) | % lost |
|---|---|---|---|---|---|---|---|---|---|
| 2 | 5.01 | 4.17 | 4.3 | 3.8 | 1049 | 1098 | 1073 | 2133 | 50 |
| 4 | 4.88 | 5.31 | 3.1 | 3.4 | 744 | 760 | 752 | 2133 | 65 |
| 16 | 5.33 | 5.01 | 3 | 2.8 | 655 | 643 | 649 | 2133 | 70 |
| 32 | 4.95 | 4.65 | 2.8 | 2.7 | 651 | 664 | 657 | 2133 | 69 |
| 64 | 4.78 | 5.52 | 2.7 | 3.1 | 646 | 657 | 652 | 2133 | 69 |
| 1080 | 5.02 | 4.8 | 2.7 | 2.6 | 615 | 615 | 615 | 2133 | 71 |

TABLE 3

Poly Amide-free Polyester fiber

| Time (min) | Sample 1 (wt, g) | Sample 2 (wt, g) | Vol titrant (mL) 1 | Vol titrant (mL) 2 | [LAS] (ppm) 1 | [LAS] (ppm) 2 | [LAS] averae (ppm) | Initial liq Conc (ppm) | % lost |
|---|---|---|---|---|---|---|---|---|---|
| 0 | 2.13 | 1.92 | 3.1 | 2.9 | 1704 | 1749 | 1726 | 1726 | 0 |
| 3 | 1.64 | 1.89 | 2.45 | 2.8 | 1676 | 1705 | 1690 | 1726 | 2 |
| 12.5 | 2.04 | 2.16 | 3.05 | 3.4 | 1746 | 1868 | 1807 | 1726 | −5 |
| 22.3 | 2.26 | 2.19 | 3.25 | 3.15 | 1696 | 1688 | 1692 | 1726 | 2 |
| 1440 | 2.18 | 1.89 | 3.1 | 2.75 | 1665 | 1669 | 1667 | 1726 | 3 |

Comparative Example 2

Near Neutral pH Disinfectant

Figure 1:
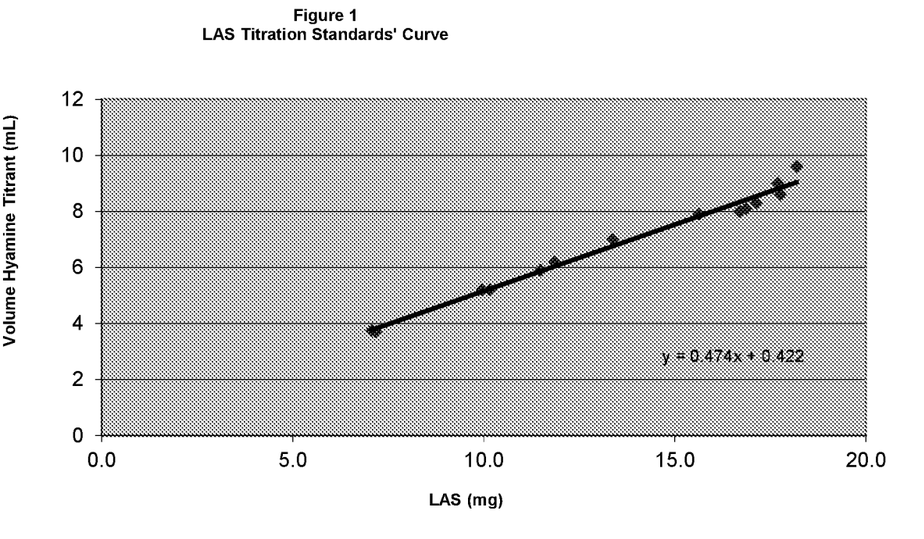
FIG. 1 illustrates a Standard Titration Curve of Linear Alkylbenzene Sulphonic Acid ("hereinafter "LAS")
Figure 2:
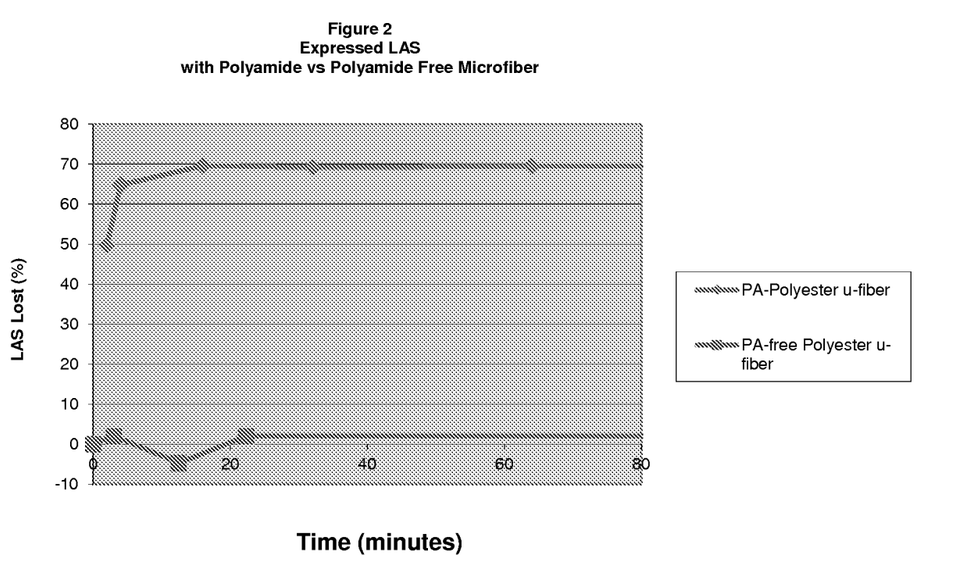
FIG. 2 compares the amount of LAS expressed from a polyamide microfiber substrate and a polyamide-free microfiber substrate over time.
Figure 3:
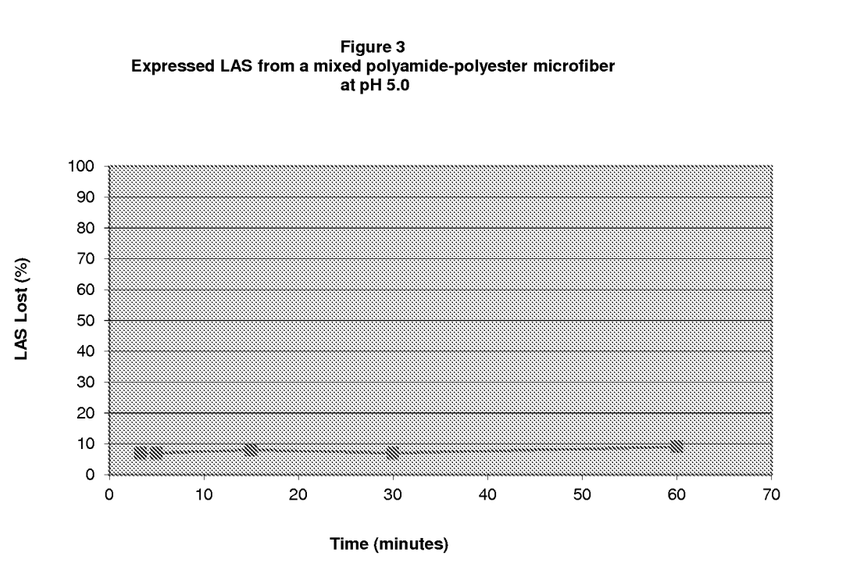
FIG. 3 illustrates the amount of LAS expressed from a polyamide-containing microfiber substrate at pH 5.
Figure 4:
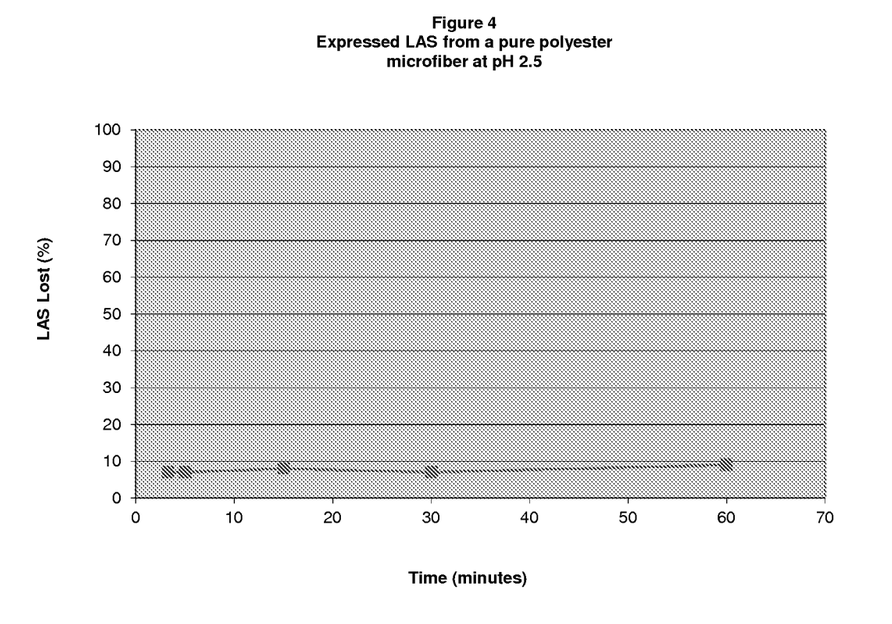
FIG. 4 illustrates the amount of LAS expressed from a polyester-containing microfiber substrate at pH 2.5.

A polyamide-containing microfiber wipe was submerged in an acid-anionic use solution having pH of 5. As shown in Table 4 below and FIG. 3, the LAS expression rose to approximately 75% which compared very favorably to the lower pH run. This supports the hypothesis that associative LAS binding to the polyamide requires first a protonation to imbue a cationic character to the matrix.

Comparative Example 3

Polypropylene Microfiber

A pure polypropylene microfiber was saturated with the same solution used in Examples 1 & 2. After expressing the liquid, the LAS measured 91% of the original use-concentration. The minimal LAS binding supports the hypothesis that without any Lewis basicity nearly all of the LAS can be expressed from the wipe. Results are provided in Table 4 below:

TABLE 4

| Time (min) | LAS from mixed PolyAmide-PolyEster microfiber (ppm) (pH 5) | LAS from PolyPropylene microfiber (ppm) (pH 2.5) |
|---|---|---|
| 2.00 | 5.0 | — |
| 3.30 | — | 7.0 |
| 4.00 | 15.0 | — |
| 5.00 | — | 7.0 |
| 15.00 | — | 8.0 |
| 20.00 | 20.0 | |
| 30.00 | 21.0 | 7.0 |
| 60.00 | 23.0 | 9.0 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of disinfecting comprising:
   wiping a surface with a wipe comprising:
   a disinfectant composition having a pH below 5 and consisting essentially of an aqueous solution of an acid anionic disinfectant selected from the group of linear alkylbenzene sulfonic acid, dodecylbenzene sulfonic acid, dodecylsulfonic acid, lauryl sulfonic acid, sulfonated oleic acid, and mixtures thereof and optionally one or more additives selected from the group of fragrance, dye, emollient, UV light protecting agents, insect repellency agents, and souring agents; and
   a polyester microfiber substrate that is substantially free of polyamides;
   wherein the wipe releases an amount of disinfectant composition on the surface sufficient to kill viruses or bacteria within 30 seconds of contact and the substrate is not pretreated before the disinfectant composition is added to it.

2. The method of claim 1, wherein the substrate is a nonwoven material.

3. The method of claim 1, wherein the substrate is a nonwoven material manufactured by spinbonding, melt-blowing, dry laid, air laid, or wet laid processes.

4. The method of claim 1, wherein the disinfectant composition has a pH below 4.

5. The method of claim 1, wherein the disinfectant composition has a pH below 3.

6. The method of claim 1, wherein the disinfectant composition has a pH below 2.

7. The method of claim 1, wherein the substrate is not pretreated with a release composition and at least 75% of the disinfectant composition is released from the substrate when squeezed.

8. A method of applying an antimicrobial composition to a surface comprising:
   wiping a surface with a wipe comprising:
   a disinfectant composition having a pH below 5 and consisting essentially of an aqueous solution of an acid anionic disinfectant selected from the group of linear alkylbenzene sulfonic acid, dodecylbenzene sulfonic acid, dodecyl sulfonic acid, lauryl sulfonic acid, sulfonated oleic acid, and mixtures thereof and optionally one or more additives selected from the group of fragrance, dye, emollient, UV light protecting agents, insect repellency agents, and souring agents; and
   a polyester microfiber substrate that is substantially free of polyamides;
   wherein the substrate is not pretreated before the disinfectant composition is added to it and at least 75% of the disinfectant composition is released from the substrate when squeezed.

9. The method of claim 8, wherein the substrate is a nonwoven material.

10. The method of claim 8, wherein the substrate is a nonwoven material manufactured by spinbonding, melt-blowing, dry laid, air laid, or wet laid processes.

11. The method of claim 8, wherein the disinfectant composition has a pH below 4.

12. The method of claim 8, wherein the disinfectant composition has a pH below 3.

13. The method of claim 8, wherein the disinfectant composition has a pH below 2.

14. The method of claim 8, wherein at least 80% of the disinfectant composition is released from the substrate when squeezed.

15. The method of claim 8, wherein at least 85% of the disinfectant composition is released from the substrate when squeezed.

16. The method of claim 8, wherein at least 90% of the disinfectant composition is released from the substrate when squeezed.

17. A method of manufacturing an antimicrobial wipe comprising:
    selecting a polyester microfiber substrate that is substantially free of polyamides and not pretreated; and
    coating a disinfectant composition onto the substrate, the disinfectant composition having a pH below 5 and consisting essentially of an aqueous solution of an acid anionic disinfectant selected from the group of linear alkylbenzene sulfonic acid, dodecylbenzene sulfonic acid, dodecyl sulfonic acid, lauryl sulfonic acid, sulfonated oleic acid, and mixtures thereof and optionally one or more additives selected from the group of fragrance, dye, emollient, UV light protecting agents, insect repellency agents, and souring agents;
    wherein at least 75% of the disinfectant composition is released from the substrate when squeezed.

18. The method of claim 17, wherein the disinfectant composition retains its antimicrobial properties and is able to be released from the substrate for at least one year after manufacturing.

19. The method of claim 17, wherein the substrate is a nonwoven material.

20. The method of claim 17, wherein the substrate is a nonwoven material manufactured by spinbonding, melt-blowing, dry laid, air laid, or wet laid processes.

21. The method of claim 17, wherein the disinfectant composition has a pH below 4.

22. The method of claim 17, wherein the disinfectant composition has a pH below 3.

23. The method of claim 17, wherein the disinfectant composition has a pH below 2.

24. The method of claim 17, wherein at least 80% of the disinfectant composition is released from the substrate when squeezed.

25. The method of claim 17, wherein at least 85% of the disinfectant composition is released from the substrate when squeezed.

26. The method of claim 17, wherein at least 90% of the disinfectant composition is released from the substrate when squeezed.

* * * * *